United States Patent
Cotten, Jr. et al.

(10) Patent No.: US 12,423,289 B2
(45) Date of Patent: Sep. 23, 2025

(54) DATA DELETION FOR BUSINESS SERVER ENVIRONMENTS

(71) Applicant: Insight Direct USA, Inc., Chandler, AZ (US)

(72) Inventors: Larry N. Cotten, Jr., Huntington Beach, CA (US); Abhijit Moharil, Tempe, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 131 days.

(21) Appl. No.: 18/530,537

(22) Filed: Dec. 6, 2023

(65) Prior Publication Data

US 2025/0190419 A1  Jun. 12, 2025

(51) Int. Cl.
*G06F 16/23* (2019.01)
*G06F 16/2457* (2019.01)

(52) U.S. Cl.
CPC ........ *G06F 16/23* (2019.01); *G06F 16/24573* (2019.01)

(58) Field of Classification Search
CPC ..... G06F 16/23; G06F 16/24573; G06F 16/25
See application file for complete search history.

(56) References Cited

U.S. PATENT DOCUMENTS

| | | | |
|---|---|---|---|
| 7,171,432 B2 | 1/2007 | Wildhagen et al. | |
| 7,263,698 B2 | 8/2007 | Wildhagen et al. | |
| 7,844,575 B2 | 11/2010 | Fukuda et al. | |
| 8,090,754 B2 | 1/2012 | Schmidt et al. | |
| 8,533,773 B2 | 9/2013 | Maes | |
| 9,483,367 B1 | 11/2016 | Patil | |
| 9,514,140 B2 | 12/2016 | Yueh | |
| 9,785,516 B2 | 10/2017 | Schefe et al. | |
| 9,805,082 B2 | 10/2017 | Bornhoevd et al. | |
| 10,346,374 B1 | 7/2019 | Johnson et al. | |
| 11,044,171 B2 | 6/2021 | Gopireddy | |
| 11,327,743 B2 | 5/2022 | Kruempelmann et al. | |
| 11,423,018 B1 * | 8/2022 | Paiz | G06F 16/243 |
| 11,562,023 B1 | 1/2023 | Batsakis et al. | |
| 11,809,506 B1 * | 11/2023 | Paiz | H04L 67/02 |
| 12,159,176 B2 * | 12/2024 | Mariappan | G06F 9/547 |
| 2005/0097086 A1 * | 5/2005 | Merchant | G06F 16/214 |
| 2006/0206507 A1 | 9/2006 | Dahbour | |

(Continued)

*Primary Examiner* — Kavita Stanley
*Assistant Examiner* — Cecile H Vo
(74) *Attorney, Agent, or Firm* — Kinney & Lange, P.A.

(57) ABSTRACT

A method of selectively migrating data for a mixed server environment including deleting a first dataset from the first database server in response to a first delete command issued to the first database management system, issuing a second delete command after deleting the first dataset, copying to a second database server a complete set of data stored by the first database server, starting a second application server, starting a second business management software platform on the second application server, and providing the second business management software platform with the business software configuration data from the second database. The first dataset is deleted by a first database management system of a first database server, and the second delete command is issued to a first business management software platform and instructs the first business management software platform to delete the first dataset.

20 Claims, 2 Drawing Sheets

(56) References Cited

U.S. PATENT DOCUMENTS

| | | |
|---|---|---|
| 2006/0230044 A1 | 10/2006 | Utiger |
| 2012/0323937 A1* | 12/2012 | Modi .................. G06F 16/2386 707/754 |
| 2014/0137262 A1* | 5/2014 | Stofberg ............. G06F 21/6218 726/26 |
| 2015/0370641 A1* | 12/2015 | Susairaj .................. G06F 16/27 707/645 |
| 2016/0306818 A1 | 10/2016 | Vijayan et al. |
| 2017/0139891 A1 | 5/2017 | Ah-Soon et al. |
| 2018/0150497 A1* | 5/2018 | Stephen ................ G06F 16/254 |
| 2019/0065329 A1* | 2/2019 | Pawar ................ G06F 16/1865 |
| 2019/0197174 A1* | 6/2019 | Kim ...................... G06F 16/258 |
| 2019/0266139 A1* | 8/2019 | Kumarasamy ........ G06F 16/182 |
| 2020/0356885 A1 | 11/2020 | Geiselhart et al. |
| 2021/0165573 A1* | 6/2021 | Demoor .............. G06F 11/1415 |
| 2021/0271670 A1* | 9/2021 | Hallgren ............. G06F 16/254 |
| 2021/0349849 A1* | 11/2021 | Haberkorn ............ G06F 16/273 |
| 2022/0121642 A1* | 4/2022 | Varley .................... G06F 16/93 |
| 2022/0222271 A1* | 7/2022 | Stolze .................... G06F 16/27 |
| 2023/0169049 A1* | 6/2023 | Sgroi .................. G06F 16/2282 707/803 |
| 2024/0123783 A1* | 4/2024 | Stieglitz .............. F16C 11/0695 |

* cited by examiner

DATA DELETION FOR BUSINESS SERVER ENVIRONMENTS

FIELD OF THE INVENTION

The present disclosure relates to computer databases and servers and, more particularly, to systems and methods for reducing time required to delete database data used by business management platforms, such as enterprise resource planning platforms.

BACKGROUND

Databases can be used to store data useful to the business operations of an organization. A database can be connected to other servers in a server system, and the data stored on the database can be accessed and used by the other servers. Databases used by a business management platform, such as an enterprise resource planning platform, can store significant quantities of historical data as well as configuration information used by the applications and programs of the business management platform. It can take significant time to delete data from the database using deletion tools included in the business management platform. Further, the use of other conventional deletion tools can render the resultant data inconsistent and unusable by the business management platform.

SUMMARY

An example of a method of selectively migrating data for a mixed server environment including deleting a first dataset from the first database server in response to a first delete command issued to the first database management system, issuing a second delete command after deleting the first dataset, copying to a second database server a complete set of data stored by the first database server, starting a second application server, starting a second business management software platform on the second application server, and providing the second business management software platform with the business software configuration data from the second database. The first dataset is deleted by a first database management system of a first database server and does not include business software configuration data for a first business management software platform operating on a first application server. The second delete command is issued to the first business management software platform and instructs the first business management software platform to delete the first dataset from the first database server. The complete set of data is copied after issuing the second delete command.

The present summary is provided only by way of example, and not limitation. Other aspects of the present disclosure will be appreciated in view of the entirety of the present disclosure, including the entire text, claims, and accompanying figures.

Figure 1:
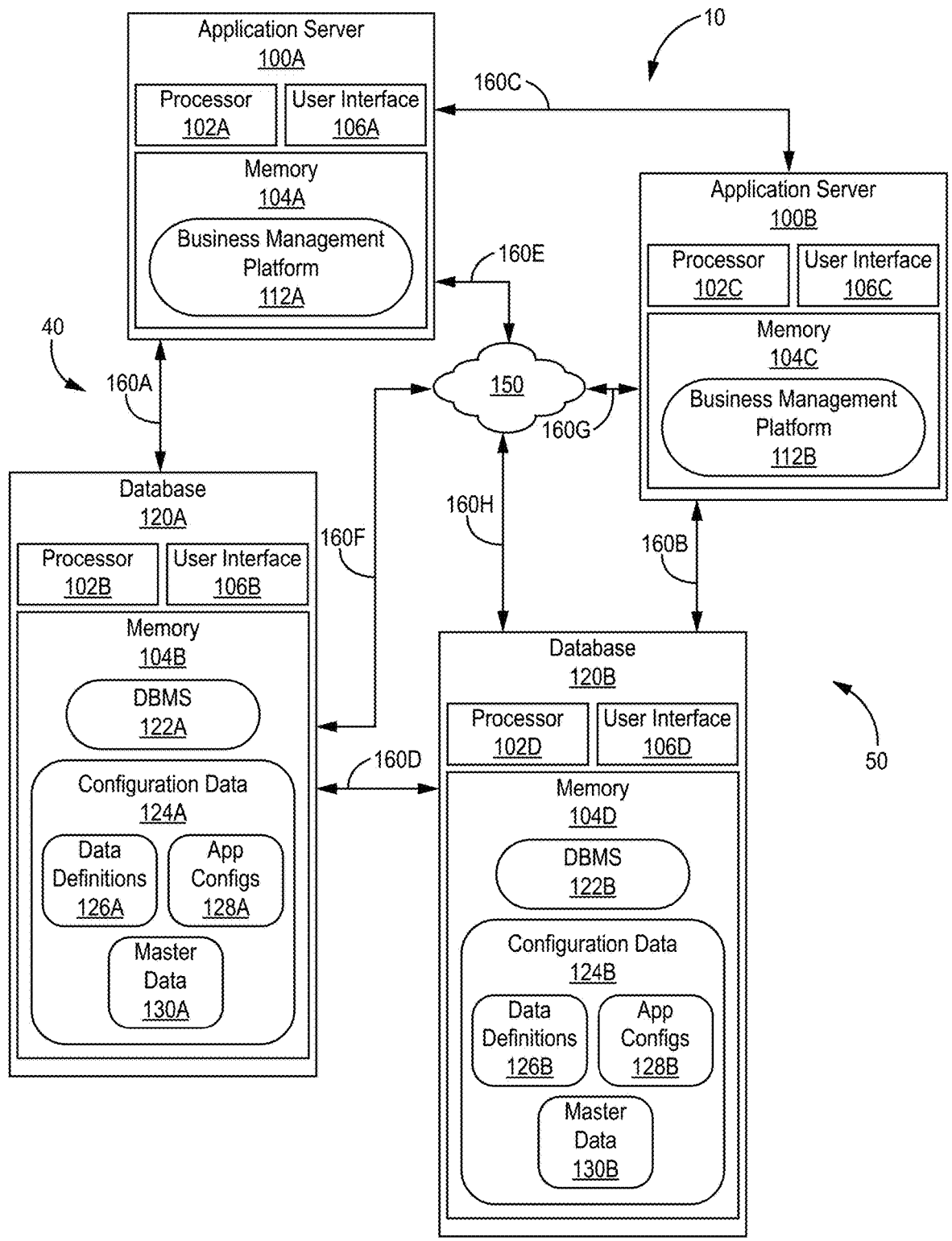
FIG. 1 is a schematic view of an example of a server system, including communicatively linked business server systems, suitable for use with the method of FIG. 2.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to methods and systems for data deletion prior to database replication or copying. In particular, the methods and systems disclosed herein significantly reduce the time required to delete data from a database used by a business management software platform prior to replication or other copying of the database. Existing methods of copying database data to a new business server installation typically replicate all data (e.g., a "brownfield" installation), including data that is not desirable to replicate, or replicate no existing data (e.g., a "greenfield" installation), necessitating manual reconstruction of previous configurations and other necessary business data (e.g., master data). The methods and systems disclosed herein, conversely, delete only a portion of the existing data and then transfer that limited portion of existing data to a new business server system.

Limiting the size of database data to be copied during replication or a similar copying operation substantially reduces system requirements for hardware required to perform the replication or other copying operation and also reduces the time required to perform the replication or other copying operation. Further, in examples where database data is being copied to an in-memory database, older data that is deprecated and/or otherwise no longer of business use can be advantageously removed prior to replication to the in-memory database to reduce the system requirements and associated hardware costs of the in-memory database. Configuration data used by the business server system is typically expensive or otherwise onerous to recreate (i.e., by re-configuring relevant settings and manually generating other configuration information) and can be preserved for replication using the methods and systems described herein.

As will be explained in more detail subsequently, the systems and methods described herein significantly reduce the time required to remove database data used by a business management platform while preserving the integrity of that data such that it is able to be used by another business management platform instance (e.g., on a different server or server system) by leveraging a combination of database deletion tools and platform deletion tools. In some examples, the systems and methods disclosed herein are able to reduce the time required to delete database data prior to replication by a factor of up to 90% relative to existing methods reliant only on platform deletion tools while preserving the integrity of the remaining data, such that the remaining data is still able to be used by a business management platform. Further, the systems and methods disclosed herein can be used to perform time-efficient replication of limited subsets of database data without requiring data mapping or other time-consuming and laborious tasks associated with data import approaches.

FIG. 1 is a schematic diagram of server system 10, which is a system that can be used to configure a new business server system based on configuration information from an existing business server system. As will be explained in more detail subsequently, system 10 is an example of a server system suitable for business server system setup method described in FIG. 2. Server setup system 10 includes business server system 40 and business server system 50. Business server system 40 includes application server 100A and database 120A. Application server 100A includes processor 102A, memory 104A, and user interface 106A, and database 120A includes processor 102B, memory 104B and user interface 106B. Memory 104A includes business management platform 112A, and memory 104B includes database management system (DBMS) 122A and configuration data 124A. Business server system 50 includes application server 100B and database 120B. Application server 100B includes processor 102C, memory 104C, and user interface 106C, and database 120B includes processor 102D, memory 104D, and user interface 106D. Memory 104C includes business management platform 112B and memory 104D includes database management system 122B and configuration data 124B. Configuration data 124A includes data definitions 126A, application configurations 128A, and master data 130A. Configuration data 124B includes data definitions 126B, application configurations 128B, and master data 130B.

Application server 100A is connected to database server 120A via communication link 160A and application server 100B is connected to database 120B via communication link 160B. In some examples, application servers 100A, 100B can be directly connected via communication link 160C and databases 120A, 120B can be directly connected via communication link 160D. As depicted in FIG. 1, server setup system 10 includes network 150, which can be used in some examples to connect server system 40 to server system 50. Communication links 160E-160F are used to connect server system 40 and server system 50 to network 150, as will be discussed in more detail subsequently.

Processors 102A-102D can each execute software, applications, and/or programs stored on memory 104. Each of processors 102A-102D can include one or more of a processor, a microprocessor, a controller, a digital signal processor (DSP), an application specific integrated circuit (ASIC), a field-programmable gate array (FPGA), or other equivalent discrete or integrated logic circuitry. Each of processors 102A-102D can be entirely or partially mounted on one or more circuit boards.

Each of memories 104A-104D is configured to store information and, in some examples, can be described as a computer-readable storage medium. Memories 104A-104D, in some examples, are described as computer-readable storage media. In some examples, memories 104A-104D include non-transitory media. The term "non-transitory" can indicate that the storage medium is not embodied in a carrier wave or a propagated signal. In certain examples, a non-transitory storage medium can store data that can, over time, change (e.g., in RAM or cache). In some examples, one or more of memories 104A-104D is a temporary memory. As used herein, a temporary memory refers to a memory having a primary purpose that is not long-term storage. One or more of memories 104A-104D, in some examples, includes volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. Memories 104A-104D, in some examples, are used by software or applications to temporarily store information during program execution by processors 102A-102D, respectively. In some examples, one or more of memories 104A-104D can additionally include long-term, non-volatile storage media. Non-volatile storage media can include but are not limited to magnetic hard discs, optical discs, flash memories and other forms of solid-state memory, or forms of electrically programmable memories (EPROM) or electrically erasable and programmable (EEPROM) memories. As compared to volatile media, non-volatile media are suited for long-term and/or persistent data storage.

Each of user interfaces 106A-106D is an input and/or output device and/or software interface, and enables an operator to control operation of and/or interact with software elements of application server 100A, database 120A, application server 100B, and database 120B, respectively. Each of user interfaces 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, one or more physical buttons, or other type of device for facilitating input and/or output of information in a form understandable to users and/or machines.

Business management platforms 112A, 112B are software platforms configured to perform one or more tasks useful to the operation of a business and include software modules useful for performing business operations. Business management platforms 112A, 112B can include one or more business applications that perform, for example, a credit card verification, a shipping address verification, order reporting, purchase order creation, inventory management, customer data management, financial consolidation, among other options. In operation, the program(s) of business software management platforms 100A, 100B can retrieve and modify data from databases 120A, 120B, respectively, in order to perform user-requested operations. For example, if a user uses business management platform 112A to create a purchase order, business management platform 112A can request and/or retrieve customer data, product data, and/or any other suitable type of data from database 120A relevant to the purchase order. Business management platforms 112A, 112B are generally configurable with a variety of software modules, programs, applications, etc. for performing various business tasks based on operator need, preference, etc. In at least some examples, one or both of business management platforms 112A, 112B is an enterprise resource planning (ERP) application. In at least some of these examples, one or both of business management platforms 112A, 112B is SAP S/4HANA, SAP R/3, and/or SAP ERPs.

The functionality of application servers 100A, 100B can be accessed by users via, for example, user interface 106A. User interface 106A can be, for example, a software interface accessible from a user device connected to application server 100A (e.g., via network 150) and can be configured to enable the user device to access the functionality of application server 100A (e.g., the functionality of business software management platform 112A). User interface 106B can similarly include a software interface to enable user devices to access functionality of application server 100B. In some examples, one or both of application servers 100A, 100B can operate and expose an application programming interface (API) to enable devices connected to applications servers 100A, 100B (e.g., user devices connected via network 150) to access functionality of business software platforms 112A, 112B, respectively, via the API(s).

DBMS 122A, 112B are database management systems. As used herein, a "database management system" refers to a system of organizing data stored on a data storage medium, such memories 104B, 104D. In some examples, a database management system described herein is configured to run operations on data stored on the data storage medium. The operations can be requested by a user and/or by another application, program, and/or software. The database management system can be implemented as one or more computer programs stored on a memory device, such as memories 104B, 104D, and executed by a processor, such as processors 102B, 102D, to organize and/or perform operations on data stored on a data storage medium.

As depicted in FIG. 1, DBMS 122A organizes data on memory 104B database 120A and DBMS 122B organizes data on memory 104B of database 120B. In some examples, each of DBMS 122A, 122B are different systems, are offered by different vendors, organize data in different manners, etc. One or both of DBMS 122A, 122B can be, for example, relational database management systems (RDBMS), object-relational database management system (ORDBMS), columnar database management systems (CDBMS), document-oriented database management systems (DoDBMS) and/or a multi-model database management system (MMDBMS). In at least some examples, DBMS 122A operates a traditional or conventional database storing data to non-volatile storage media and DBMS 122B operates an in-memory database storing data to volatile storage media (e.g., volatile memory, random access memory, etc.). As a specific example, DBMS 122A can be OracleDB and DBMS 122B can be SAP HANA or a second instance of OracleDB.

Business management platforms 112A, 112B create and manage data on databases 120A, 120B using DBMSs 122A, 122B. Business management platforms 112A, 112B can include for example, one or more plug-ins, connectors, etc. that enable the program(s) of business management platforms 112A, 112B to create, modify, retrieve, delete, copy, and perform other operations on the data organized by DBMS 112A, 112B, respectively. Business management platforms 112A, 112B can include data management modules or applications configured to interface with databases 120A, 120B, respectively, and perform operations on the data stored therein. A user can use software functionality of business management platforms 112A, 112B to create, modify, delete, etc. the data stored to databases 120A, 120B. Additionally and/or alternatively, users directly issue commands to DBMSs 122A, 122B to perform data operations on the data stored to databases 120A, 120B (e.g., using user interfaces 106A, 106B). For example, a user can issue one or more commands to DBMS 122A using user interface 106B to modify the database data stored to memory 104B. As a specific example, users can issue one or more commands to delete data stored to memory 104B and, further, to subsequently copy the remaining data from memory 104B to memory of another device, such as memory 104D of database 120B. Data can be deleted from one of databases 120A, 120B by, for example, issuing a command to truncate a table storing data.

The data organized by DBMS 122A and used by business software management platform 112A during operation and can include, for example, one or more of financial data, customer data, accounts payable data, and intermediate document (IDoc) data. Similarly, DBMS 122B and used by business software management platform 112B during operation and can include, for example, one or more of financial data, customer data, accounts payable data, and intermediate document (IDoc) data.

Configuration data 124A, 124B is configuration data stored to databases 120A, 120B, respectively, that describes various configuration information and other core data used by the business software (e.g., business applications) of business management platforms 112A, 112B, respectively. Configuration data 124A, 124B is managed by DBMSs 122A, 122B, respectively, as database data of databases 120A, 120B, respectively. In the depicted example, configuration data 124A include data definitions 126A, application configurations 128A, and master data 130A, and configuration data 124B include data definitions 126B, application configurations 128B, and master data 130B. However, in other examples, each of configuration data 124A, 124B can lack some or all of data definitions 126A, 126B, application configurations 128A, 128B, and master data 130A, 130B, respectively.

Data definitions 126A, 126B include data definitions describing the data stored to databases 120A, 120B, respectively. The data definitions stored by data definitions 126A, 126B can be, for example, metadata describing the location(s) and organization of data stored to databases 120A, 120B, respectively. In some examples, one or both of data definitions 126A, 126B can be referred to as a "data dictionary." The data definitions enable the program(s) of business management platforms 112A, 112B, respectively, to locate data on databases 120A, 120B, respectively. For example, the data definitions of data definitions 126A, 126B can include metadata describing objects used by the applications of business management platforms 112A, 112B, respectively, as well as how those objects are mapped to the data stored by databases 120A, 120B, respectively. In the depicted example, data definitions 126A, 126B are shown as stored to memories 104A, 104B, respectively. However, in other examples, data definitions 126A, 126B can be stored to memories 104C, 104D, respectively, of databases 120A, 120B, respectively, and business software management platforms 112A, 112B can access the definitions stored by data definitions 126A, 126B, respectively, by accessing databases 120A, 120B, respectively.

Application configurations 128A, 128B define application configuration information for the business applications of business management platforms 112A, 112B. Application configuration data 128A, 128B can include, for example, one or more settings, preferences, etc. for controlling the operation of the business application(s) of business management platforms 112A, 112B, respectively.

Configuration data 124A, 124B can also include master data 130A, 130B, respectively, which is master data usable by business management platforms 112A, 112B. Each of master data 130A and master data 130B acts as a master record or source of truth on database 120A and database 120B, respectively, for various customer, employee, supplier, vendor, product, and/or asset (e.g., inventory) data, among other options, of a business operating application server 100A and/or application server 100B, respectively. Master data 130A, 130B can be used by the respective program(s) of business management platforms 112A, 112B to, for example, create pricing data, retrieve or create employee-specific data, create purchase order data, update and/or manage inventory information, perform sales operations, and/or perform marketing tasks, among other examples. The aforementioned uses of master data 130A, 130B are included for illustrative and descriptive purposes and are non-limiting. As a specific and non-limiting example, master data 130A and/or master data 130B can include inventory information as well as information describing physical locations operated by a business, and can be used to identify inventory location at those various physical locations, identify available inventory that can be assigned and/or deliver to those physical locations, and create and order or task for the available inventory to be so assigned and/or delivered to those physical locations. Other options are possible and the aforementioned use of master data 130A, 130B is merely one example of the types and uses of data that can be included as master data 130A, 130B.

Network 150 is a network suitable for connecting and facilitating network communication between two or more of application server 100A, application server 100B, database 120A, and database 120B. Network 150 can include one or more connected user devices for allowing users to access the functionality of any of application server 100A, application server 100B, database 120A, and database 120B. Network 150 can include any suitable combination of local network and wide area network (WAN) elements or components to facilitate communication between two or more of application server 100A, application server 100B, database 120A, and database 120B. In some examples, network 150 can be or include the Internet.

Communication links 160A-160H are configured to allow transmittal of data between the components of server setup system 10 and can each include one or more wired or wireless connections as well as one or more network devices. As described previously, communication link 160A connects application server 100A to database 120A, communication link 160B connects application server 100B to database 120B, communication link 160C connects application server 100A to application server 100B, communication link 160D connects database 120A to database 120B, communication link 160E connects application server 100A to network 150, communication link 160F connects database 120A to network 150, communication link 160G connects application server 100B to network 150, and communication link 160H connects database 120B to network 150.

Server setup system 10 does not require all of communication links 160A-160H to facilitate electronic communication between application server 100A, application server 100B, database 120A, and database 120B. In some examples, server setup system 10 can lack communication links 160E-160H and application server 100A, application server 100B, database 120A, and database 120B can communicate using communication links 160A-160D. In further examples, server setup system 10 can lack communication links 160A-160D and application server 100A, application server 100B, database 120A, and database 120B can communicate using communication links 160E-H. In yet further examples, server setup system 10 can include only some communication links of communication links 160A-160D and/or communication links 160E-160H. For example, server setup system 10 can include only communication links 160A-B and communication links 160E-160H in some examples, such that server setup system 10 lacks any direct communication link between server systems 40 and 50 (e.g. communication links 160C and 160D).

Application server 100A and database 120A together form business server system 40 and application server 100B and database 120B together form business server system 50. Application server 100A uses data stored to database 120A to perform business operations and application server 100B uses data stored to database 120B to perform business operations. While application server 100A and database 120A are discussed generally herein as separate devices, in at least some examples, application server 100A and database 120A can be virtual devices, servers, etc. virtualized on a single device or across any suitable number of devices. Similarly, while application server 100B and database 120B are discussed generally herein as separate devices, in at least some examples, application server 100B and database 120B can be virtual devices, servers, etc. virtualized on a single device or across any suitable number of devices. In some examples, business server system 40 and business server system 50 can also be virtualized on a single device or across a distributed system.

Figure 2:
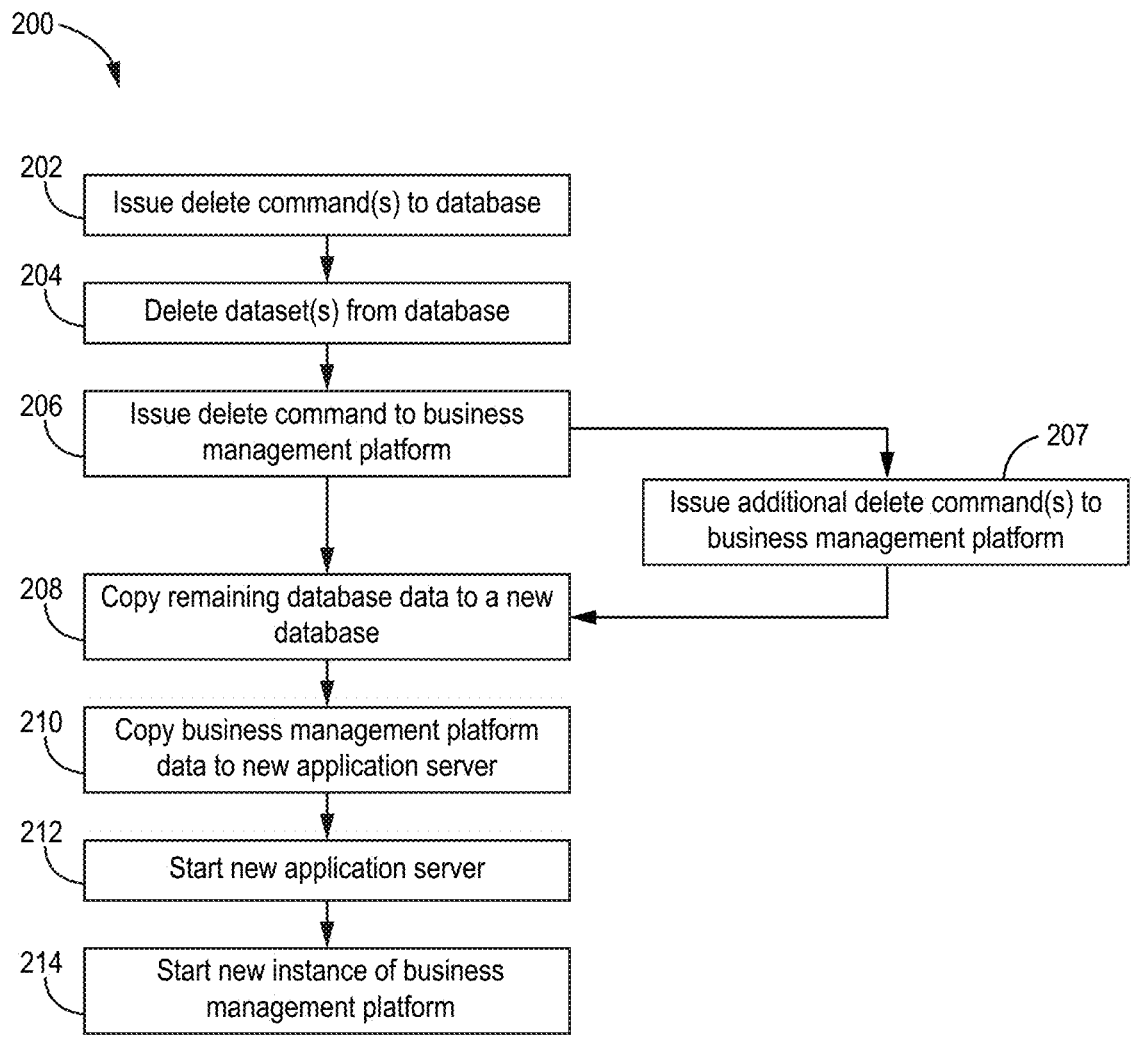
FIG. 2 is a flow diagram of an example of a method of deleting database data from a database used by a business management software platform.

FIG. 2 is a flow diagram of method 200, which is a method of selective data removal from a database that manages data for a business management platform and database replication. As will be explained in more detail subsequently, method 200 enables configuration data (i.e., configuration data 124A) to be copied in whole or in part from business server system 40 to business server system 50, thereby enabling business server system 50 to leverage pre-existing configuration information created during setup and use of business server system 40 and saving significant time as compared to methods that require manual reconstruction of configuration information.

Method 200 includes steps 202-214 of issuing a delete command to a database (step 202), deleting a dataset from the database (step 204), issuing a subsequent delete command to a business management platform (step 206), copying remaining database data to a new database (step 208), copying business management platform data to a new application server (step 210), starting the new application server (step 212) and starting a new instance of the business management platform (step 214). Method 200 is described generally herein with respect to the components of server setup system 10 (FIG. 1), but method 200 can be used to perform data removal from any suitable server system including a business management platform configured to use data stored to a database.

Method 200 enables improved data deletion prior to database replication and is suitable to delete data prior to replicating server information to a new database system (e.g., a DBMS), new database hardware, a new business management system, and/or new application server hardware. Database deletion prior to replication (i.e., copying) can significantly reduce costs associated therewith. Notably, all data stored to a database is typically moved to volatile memory as database data is copied. Reducing the size of a database can significantly reduce the quantity of volatile memory required to perform a replication operation. Further, newer in-memory databases store all, substantially all, or a significant portion of database data to volatile memory. Accordingly, upgrading an existing database system to an in-memory database format can require significant amounts of volatile memory to store the large volumes of data that typically are present on existing and/or legacy databases. Existing database servers used for traditional database types typically do not have sufficient volatile memory to run an in-memory database, requiring the construction of new servers having large quantities of volatile memory. Removing old, deprecated, and/or unnecessary data from the database to be upgraded prior to upgrading the database to the in-memory format can significantly reduce the total quantity of data needed to be replaced to the in-memory format and, as such, can significantly reduce costs required to construct servers for in-memory database conversions.

As will be explained in more detail subsequently, method 200 offers significant time-savings over conventional methods of data deletion. Deleting data from a database used by a business management platform, such as an ERP (e.g., SAP ERP, etc.), is typically performed by issuing a delete command to the business management platform specifying the relevant data to be deleted. The business management platform then requests deletion of the specified data. Due to the age of most in-use business management platforms, deletion tools included therewith take significant periods of time to delete data. For example, on some in-use business management platforms, deletion of 25 terabytes (TB) of data is projected to require a time period of 18 months.

Method 200 advantageously leverages delete commands issued to the DBMS used by the business management platform (i.e., bypassing the business management platform for data deletion) and subsequent, redundant delete commands issued to the business management platform targeting the same data in order to cause the business management platform to update data definitions used by the business management platform. The sequential, redundant delete commands used by method 200 enable significant time savings over conventional techniques of data deletion and, further, achieve those time savings without compromising the integrity of the data definitions used by the business management platform. Notably, methods that do not include a second, redundant delete command issued to the business management platform are not able to update the data definitions used by the business management platform and, as such, do not produce database data that is usable by the any instance of the business management platform. The sequential and redundant deletion outlined in method 200 can reduce the deletion time required for 20 TB of database data from approximately 18 months to a time period ranging from several weeks to one or two months.

Method 200 can be performed in part or in whole by a human operator accessing the functionality of the devices of server setup system 10 and/or in part or in whole by an executable computer program (e.g., a script, an application, etc.). In at least some examples, a portion of the steps of method 200 are performed by a human operator and a portion of the steps of method 200 are performed by an executable computer program (i.e., executed by one of processors 102A-102D).

In step 202, one or more delete commands are issued to DBMS 122A to delete a dataset from memory 104B. The dataset can be stored to at least one non-volatile memory of memory 104B and can be of any suitable size. The delete command(s) identify the specific files of the dataset that should be deleted. The delete command(s) can identify files according to file location, such as the specific table(s) and/or column(s), row(s), etc. in which the relevant data is stored (i.e., in examples where database 120A is a relational database using tables to store data). The delete command(s) do not target data definitions 126A and, in at least some examples, do not target configuration data 124A (including data definitions 126A, application configurations 128A, and master data 130A). Notably, configuration data 124A, and in particular application configuration data 128A and master data 130A, is typically developed by a business operating server setup system 10 over long periods of time (e.g., over several decades) and, accordingly, it can be disadvantageous to the operation of the business to delete configuration data 124A. Further, as described previously, preserving data definitions 126A allows remaining data on database 120A, including application configurations 128A and/or master data 130A, to be replicated to a new database (i.e., database 120D) and used by an instance of the business management platform.

In at least some examples, the dataset subject to the delete command(s) include all database data on memory 104B other than configuration data 124A. In other examples, the dataset can be less than all database data on memory 104B. Each delete command issued in step 202 can be, for example, a command to delete or truncate one or more tables storing client data, customer data, or any other suitable type of data for deletion prior to replication in step 208. In some of these examples, the command issued in step 202 can include a truncate table statement issued to an instance of OracleDB.

The targets for deletion defined in each issued delete command can be manually-determined by, for example, inspecting the contents of database 120A and identifying data that is suitable for deletion prior to replication. In at least some examples where database 120A is a relational database, deletion targets can be identified in part by first inspecting table header information to identify relevant tables and by subsequently inspecting the contents of those tables. In examples where relevant rows, columns, etc. of a table that are identified as targets for deletion include references to other locations, tables, etc. of database 120A, a user or computer program can also include those locations, tables, etc. as targets for the same or a subsequent delete command to improve the consistency of the remaining data on database 120A.

The command(s) issued in step 202 can be issued by a user via, for example, user interface 106B and/or by a user device of network 150 communicatively connected to database 120 via communication link 160F and other components of network 150. The command issued in step 202 can also be, for example, a command to an API operated by database 120A to invoke deletion functionality of DBMS 122A. The delete command(s) can be issued using, for example, a command line tool, a graphical tool of DBMS 122A, or any other suitable method of issuing delete commands to DBMS 122A.

In step 204, DBMS 122A deletes the data identified in the command(s) issued in step 202 from memory 104B of database 120A according to the command issued in step 202. The program(s) of DBMS 122A receive the command issued in step 202 and delete database data from database 120A according to the delete command. Step 204 can be performed to delete data specified by each delete command substantially immediately after each delete command is issued to DBMS 122A. For example, if the command issued in step 202 instructs DBMS 122A to truncate a table, DBMS 122A modifies data stored to database 120A to truncate the relevant table as outlined by the delete command.

In step 206, a second delete command is issued to business management platform 112A. The additional delete command instructs the program(s) of business management platform 112A to delete the same data that was targeted by the command issued in step 202 and that was deleted in step 204. In response to the command, business management platform 112A attempts to delete the already-deleted files (i.e., deleted in step 204). As business management platform 112A attempts to access an already-deleted file or data entry in response to the delete command, the program(s) of business management platform 112A recognize(s) that the file or data entry has already been deleted or is otherwise missing, and update(s) data definitions 126A to remove references to the file or data entry. Business management platform 112A updates data definitions 126A in this manner for all files specified in the second delete command (i.e., all files deleted in step 204). Business management platform 112A can be configured to directly modify data definitions 126A and/or can command DBMS 122A to modify data definitions 126A. In at least some examples, the delete command issued in step 206 can specify additional data that was not deleted in step 204 in addition to the data that was deleted in step 204.

The delete command issued in step 206 can be, for example, a client delete command (i.e., for deleting data from an SAP client) or a tool for performing a client delete task (e.g., a datasync manager tool). The delete command can also be a generic delete command, a purge command, or any other suitable deletion command issuable to business management platform 112A. The delete command 206 can be issued using, for example, one or more software tools of business management platform 112A (e.g., one or more graphical software tools).

In some examples, it is advantageous to issue additional delete commands to business management platform 112A to delete data not targeted in step 202 and step 206. For example, it may be inconvenient or otherwise technically difficult to delete certain data from database 120A using the deletion tools of DBMS 122A. However, it may nonetheless be desirable to delete that data prior to database replication. As such, the native delete tools of business management platform 112A can be used to both delete data from database 120A and update data definitions 126A for limited quantities of data. In these examples, method 200 proceeds to step 207 following step 206. In examples where additional data deletion is not advantageous and/or necessary, method 200 proceeds to step 208 following step 206.

In step 207, one or more additional delete command(s) are issued to business management platform 112A to delete additional data from database 120A. The additional delete command(s) target data not deleted in step 202. As such, the additional delete commands cause the deletion tools of business management platform 112A to remove data from database 120A (i.e., by modifying data of database 120A and/or by commanding DBMS 122A to delete the specified data) and to update data definitions 126. The size of data deleted by the command(s) issued in step 207 is generally of a limited size such that performance of step 207 does not significantly increase the time required to perform method 200. The delete command(s) issued in step 207 can be issued in the same way or substantially the same way as the delete command(s) issued in step 206.

Each of steps 208, 210, 212, 214 is optional and can be performed in examples where it is desirable to replicate database 120A, where it desirable to replicate application server 100A, in examples where it is desirable to start application server 100B after copying data from database 120A to database 120B in step 208, and in examples where it is desirable to start business management platform 214 following step 208, respectively. In at least some examples, some or all of steps 208, 210, 212, 214 can be omitted from method 200. For example, steps 202-206 and/or 202-207 can be performed to reduce the time required to remove data from database 120A (e.g., to increase available storage for storing further data to database 120A) without replicating database 120A or performing other further steps of method 200. Database deletions in these examples can target, for example, older and/or deprecated of low business value to the business operating business server system 40.

In step 208, the data remaining on database 120A following steps 202-206 or 202-207 is copied to database 120B. The data can be copied by, for example, replicating database 120A to database 120B from database 120A to database 120B. If method 200 is performed to copy existing configuration information (i.e., configuration data 124A) to a new installation of substantially the same or the same DBMS and business management platform, step 208 can be performed by replicating database 120A to database 120B without further configuration or manipulation of the configuration information and other copied data. In examples where method 200 is performed to copy existing configuration information to a new or existing installation of a different DBMS and/or business management platform, the replicated data can be further manipulated to convert the data into a format, structure, etc. that is suitable for use by the new DBMS and/or business management platform.

Data replication requires significantly less time and technical expertise than other methods (e.g., data import to a different DBMS) of data copying and, to this extent, method 200 is discussed generally herein with respect to data replication operations. However, method 200 and, in particular, steps 202-208 can be performed in substantially the same manner and confer substantially the same advantages to examples where it is desirable to import the remaining data (i.e., to a different format, structure, etc.) rather than replicate the remaining data.

In step 210, applications and other elements of business management platform 112A are copied to application server 100B. In some examples, business management platform 112A data can be replicated on application server 100B to create business management platform 112B. In yet further examples, application data (e.g., application files and data for one or more applications of business management platform 112A) can be imported or replicated to application server 100B for use by business management platform 112B. The copied application data can be stored to application server 100B and/or database 120B.

In step 212, application server 100B is started. Application server 100B draws on and uses the data of database 120B. Application server 100B can be a new application server or an existing application server configured to use data stored to database 100B. Starting application server 100B transitions application server 100B from an inactive state to an active state. In the active state, application server 100B is operable to perform business operations and functions as a production environment.

In step 214, an instance of a business management platform (i.e., business management platform 112B) is started on application server 100B. As described previously, business management platform 112B can be an instance of the same business management platform as business management platform 112A or can be an instance of a different business management platform. Starting the instance of the business management platform 112B initializes or otherwise brings the business management platform 112B into an operational state such that users can use the functionality of business management platform 112B.

As described previously, method 200 significantly decreases the time required to delete database data prior to copying. Using DBMS deletion tools (i.e., in steps 202-204) to delete database data requires significantly less time than deletion methods that use the deletion tool(s) of a software business management platform. However, DBMS deletion tools are not able to update data definitions used by a business management software platform, and use of DBMS deletion tools can render data a database unusable by the business management platform. Advantageously, method 200 includes step 208, which leverages business management platform deletion tools to as a method of updating data definitions used by the business management platform. Accordingly, method 200 decreases the time required to remove large quantities of data used by a business management platform while preserving the integrity of the remaining data. Advantageously, this allows the remaining data to be copied to a new server system (e.g., business server system 50) for use in that server system. As noted previously, method 200 enables a limited subset of database data to be replicated (i.e., using a replication tool). Advantageously, this allows for some, but not all database data to be copied to a new server without requiring data-mapping and other time- and labor-intensive techniques used for data importation.

Method 200 confers particular advantages to examples where it is desirable to use existing configuration data in a new server system environment. Method 200 decreases the amount of time required to isolate configuration data (e.g., configuration data 124A), decreasing the amount of time required to create a new business server environment (e.g., business server system 50) that uses previously-generated configuration data. Notably, manual reconstruction of configuration information, such as application configurations 128A and/or master data 130A, can be significantly time intensive. In some instances, reconstruction of application configuration 128A or master data 130A may be impossible or significant impracticable. For example, personnel responsible for creating application configurations 128A may no longer be available (e.g., due to a change in employment), necessitating preservation of application configurations 128A in a new system environment. Further, the business-specific data stored as master data 130A may record significant volumes of data that may require a significant amount of to recreate, during which the business operating business server system 50 may not be able to conduct normal business and, consequently, may lose significant revenue. As such, method 200 provides significant time savings for businesses seeking to replicate or otherwise copy configuration information across business server systems.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of selectively migrating data for a mixed server environment, the method comprising:
    deleting, by a first database management system of a first database server, a first dataset from the first database server in response to a first delete command issued to the first database management system, wherein the first dataset does not include business software configuration data for a first business management software platform operating on a first application server;
    issuing, to the first business management software platform, a second delete command after deleting the first dataset, the second delete command instructing the first business management software platform to delete the first dataset from the first database server;
    copying to a second database server, after issuing the second delete command, a complete set of data stored by the first database server;
    starting a second application server;
    starting a second business management software platform on the second application server; and
    providing the second business management software platform with the business software configuration data from the second database.

2. The method of claim 1, wherein the second delete command causes the first application server to update a data dictionary to reflect the deletion of the first dataset caused by the first delete command, wherein the data dictionary:
    comprises metadata of all data of the first database that is accessible by the first business management software platform, and
    is maintained by first business management software platform.

3. The method of claim 2, wherein deleting the first dataset comprises truncating at least one table of the first database server.

4. The method of claim 3, wherein the second delete command instructs the first business management software platform to delete client data comprising the first dataset from the first database server.

5. The method of claim 4, wherein:
    the second delete command instructs the first business management software platform to delete a second dataset from the first database server,
    the second dataset does not include the business software configuration data, and
    issuing the second delete command comprises deleting the second dataset from the first database server.

6. The method of claim 5, the business software configuration data comprises at least one of:
    application configuration data describing at least one configuration of at least one business application, and
    master data.

7. The method of claim 6, wherein the second database server comprises a second database management system for managing data stored to the second database server, and the second database management system is an in-memory database system.

8. The method of claim 7, wherein the first database management system comprises at least one disk storage mechanism.

9. The method of claim 6, wherein the first dataset includes one or more of financial data, customer data, accounts payable data, and intermediate document data.

10. The method of claim 9, wherein the first business management software platform comprises a first instance of the at least one business application and wherein starting the second business management software platform comprises starting a second instance of the at least one business application on the second application server.

11. The method of claim 10, wherein the first dataset comprises all data of the first database server other than the business software configuration data, such that the complete set of data includes only the business software configuration data.

12. The method of claim 10, and further comprising, before copying the complete set of data stored by first database server:
    issuing at least one third command to the first business management software platform to delete a second dataset from the first database server; and
    deleting, by the first business management software platform, the second dataset from the first database server.

13. The method of claim 12, wherein the first dataset and second dataset collectively comprise all data of the first database server other than the business software configuration data, such that the complete set of data includes only the business software configuration data.

14. The method of claim 13, and further comprising, before copying the complete set of data stored by first database server:

issuing at least one fourth command to the first business management software platform to delete a third dataset from the first database server; and deleting, by the first business management software platform, the third dataset from the first database server.

15. The method of claim 12, wherein the first dataset, second dataset, and third dataset collectively comprise all data of the first database server other than the business software configuration data, such that the complete set of data includes only the business software configuration data.

16. The method of claim 10, and further comprising copying, before starting the second instance of the at least one business application, the at least one business application from the first application server to the second application server.

17. The method of claim 16, and wherein the first database management system is provided by a first vendor and the first business management software platform is provided by a second vendor different than the first vendor.

18. The method of claim 17, wherein the first database management system is a relational database management system.

19. The method of claim 18, wherein the first business management software platform is an enterprise resource planning software platform.

20. The method of claim 19, wherein starting the second application server comprises transitioning the second application server from an inactive state to an active state.

* * * * *